United States Patent [19]
Webb et al.

[11] Patent Number: 5,924,168
[45] Date of Patent: *Jul. 20, 1999

[54] CASTER ASSEMBLY MECHANISM

[75] Inventors: Andrew L. Webb; John M. Burke, both of Jacksonville, Fla.

[73] Assignee: Webb Equipment Co., Inc., Jacksonville, Fla.

[ * ] Notice: This patent is subject to a terminal disclaimer.

[21] Appl. No.: 09/174,218

[22] Filed: Oct. 16, 1998

Related U.S. Application Data

[63] Continuation of application No. 08/829,942, Apr. 1, 1997., Pat. No. 5,822,829

[51] Int. Cl.⁶ .................................................. B60B 33/00
[52] U.S. Cl. .................................................. 16/30; 16/34
[58] Field of Search .................................. 16/30, 29, 19, 16/32, 34; 248/129; 280/79.11, 79.3, 189

[56] References Cited

U.S. PATENT DOCUMENTS

| | | | |
|---|---|---|---|
| 1,604,723 | 10/1926 | Rutherford . | |
| 2,126,811 | 8/1938 | Rambo et al. | 16/30 |
| 2,521,819 | 9/1950 | Baer | 214/65 |
| 3,250,513 | 5/1966 | Fenner et al. | 254/92 |
| 3,404,425 | 10/1968 | Wilder | 16/30 |
| 3,845,933 | 11/1974 | Heizer, Jr. | 254/8 R |
| 4,092,760 | 6/1978 | Lowe | 16/35 R |
| 5,131,781 | 7/1992 | Klein | 403/254 |
| 5,276,941 | 1/1994 | Chen | 16/47 |
| 5,330,064 | 7/1994 | Hall | 16/30 |
| 5,344,169 | 9/1994 | Pryor et al. | 248/129 |
| 5,426,817 | 6/1995 | Rekuc | 16/30 |
| 5,457,849 | 10/1995 | Branson et al. | 16/30 |
| 5,716,186 | 2/1998 | Jensen et al. | 414/458 |

*Primary Examiner*—Chuck Y. Mah
*Attorney, Agent, or Firm*—Rockey, Milnamow & Katz, Ltd.

[57] ABSTRACT

A caster assembly for engaging, lifting and roll transporting columns of support racks, such as warehouse pallet racks, for movement of the support racks, includes an adaptor bracket secured to a housing of the caster assembly for engaging holes arranged on a web portion of a two-lines-of-holes-type column. The adaptor bracket is secured to the housing using fasteners arranged through selectively spaced fastener holes through a front wall of the housing. For a line-of-holes single type column, the adaptor bracket can be removed and individual lugs can be secured to the selectively spaced holes of the housing which correspond to the hole spacing of the column. Thus, the same caster assembly can be adapted to engage a column of either type.

9 Claims, 3 Drawing Sheets

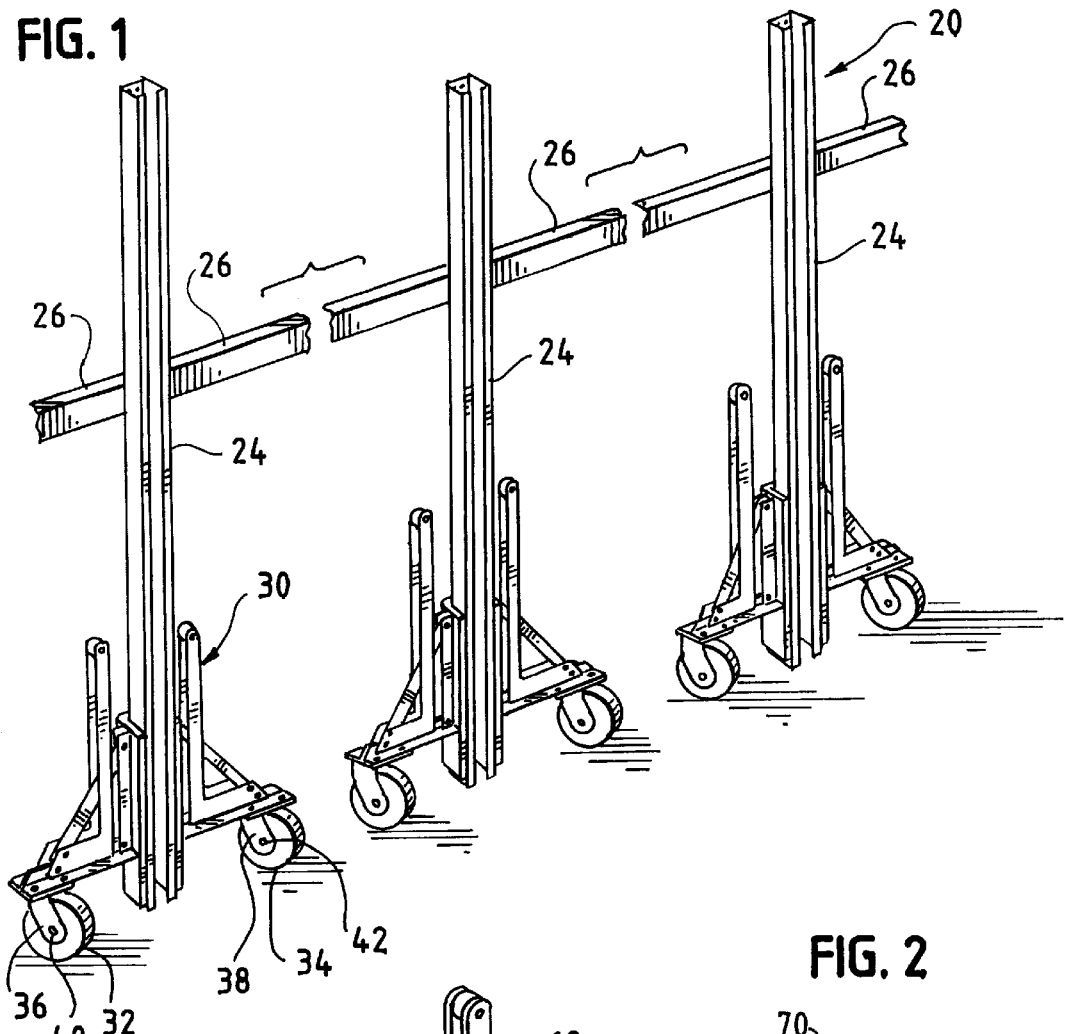
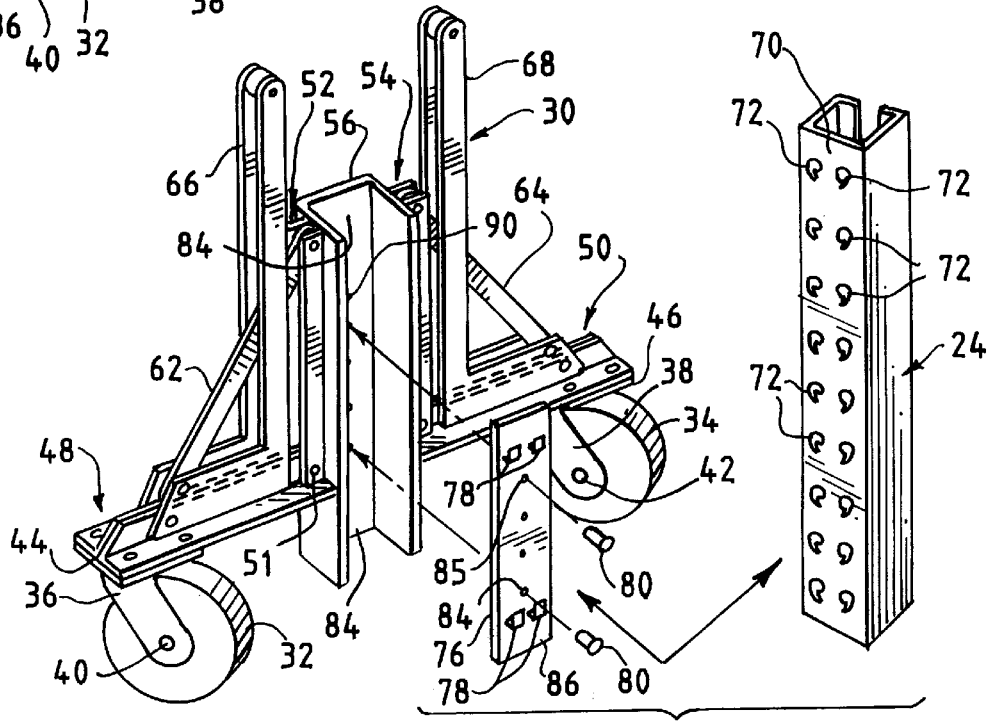

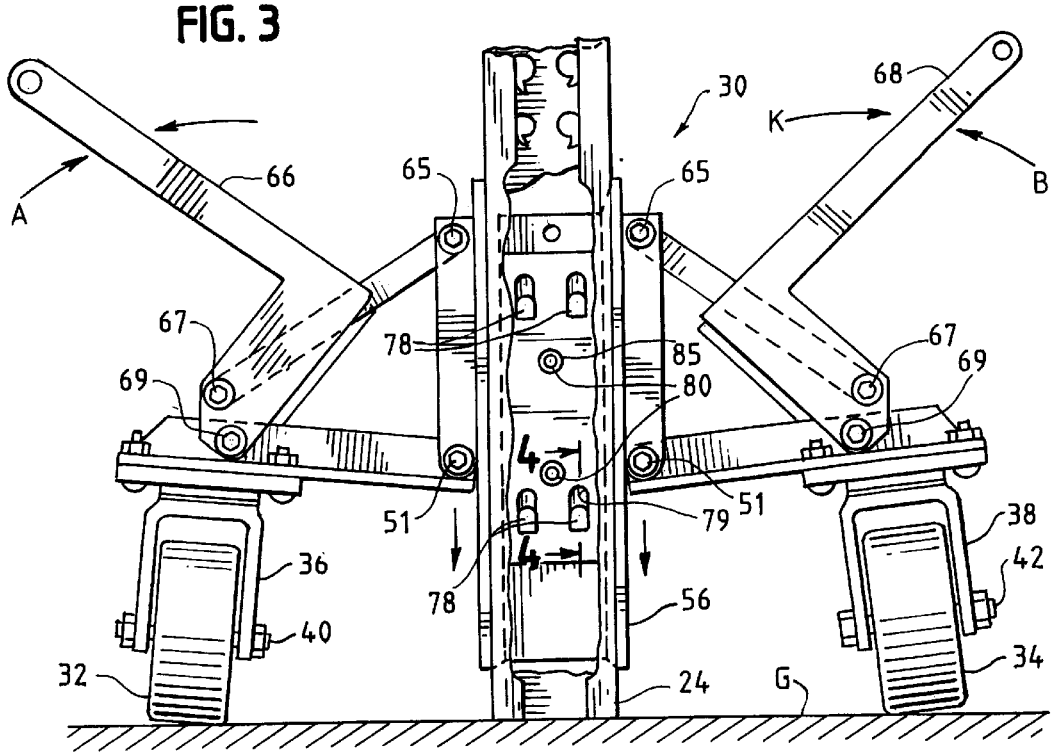
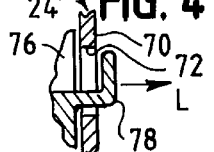
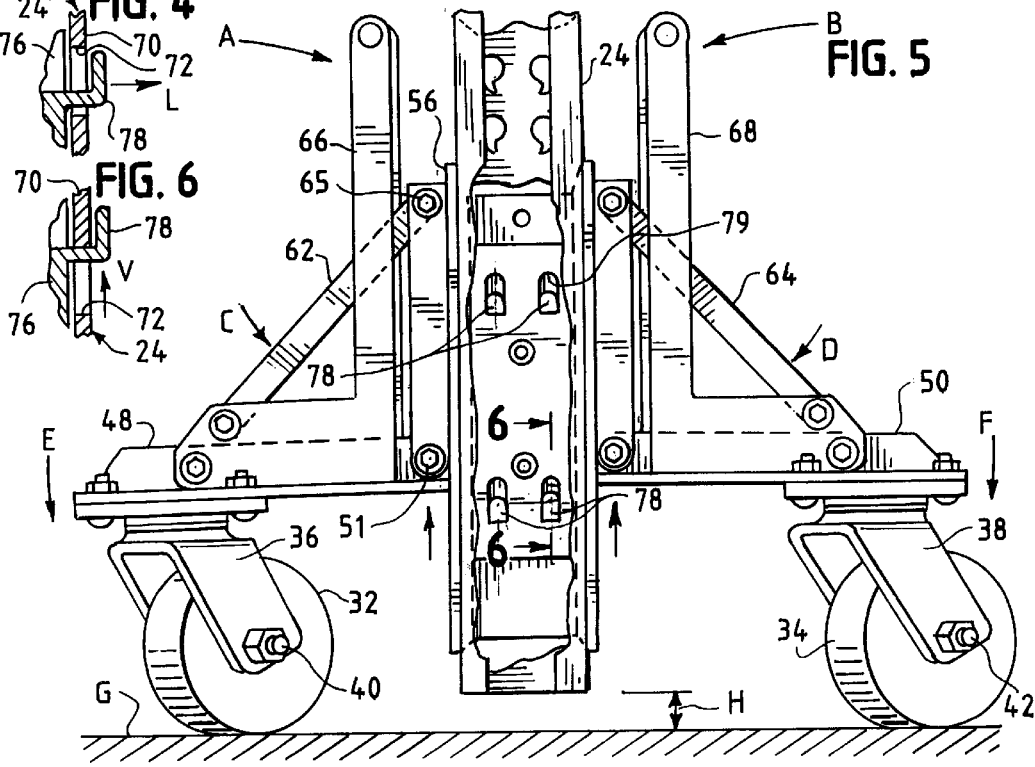

CASTER ASSEMBLY MECHANISM

This application is a continuation of U.S. Ser. No. 08/829,942 filed Apr. 1, 1997, U.S. Pat. No. 5,822,829.

TECHNICAL FIELD OF THE INVENTION

The present invention relates to a caster assembly for moving columns, and particularly a caster assembly for connecting to and moving columns of a storage rack assembly.

BACKGROUND OF THE INVENTION

Storage rack assemblies have widespread use in warehouses, factories, and other industrial applications. Storage racks typically include a plurality of columns arranged in a grid pattern and interconnected by beams spanning between the columns. Typically, the columns are channel shaped in cross-section and have engaging holes arranged spaced longitudinally on a web portion of the channel shape. The engaging holes can be arranged in two vertical lines such that the ends of two beams arranged at the same elevation, but within adjacent bays, can connect to the web portion. The connection between columns and beams is explained, for example, in U.S. Pat. No. 5,131,781. Alternately, the engaging holes can be arranged spaced apart vertically in a single line along a center line of the web portion.

In the process of assembling storage racks for a warehouse, for example, the columns of a plurality of bays are assembled with the interconnecting beams to form an elongated, tall storage rack section. It is advantageous if the elongated storage rack section could be assembled at one location and then transported to its operating position. Thus, a single assembly station can be used to assemble racks rather than assembling each rack at its operating position. However, once assembled, the tall lattice of the storage rack section is somewhat unstable and heavy. In order to transport such storage rack within a warehouse it is known to employ a plurality of caster devices to lift columns of the storage rack and roll the storage rack section into its operational position, and then to remove the caster devices.

It is known to temporarily fix the caster devices to a bottom region of the columns of a storage rack section to provide for rolling the entire section into place. The caster assemblies each include a vertically arranged channel section for receiving the column and a single line of lugs within the channel section for engaging a single line of holes arranged along a web portion of the column. In these known assemblies, the lugs are parts of a connector permanently attached to the caster housing and, the caster assemblies are not interchangeable or adaptable between column styles.

It would be desirable to simplify the adaptation of caster assemblies to columns by providing a caster assembly which can be easily converted to engage either a single engagement hole-column column style to a double engagement hole-column style.

SUMMARY OF THE INVENTION

The present invention provides a caster assembly for attachment to columns of a storage rack system which can be easily converted to attach to either a double-line-of holes storage rack column or to a single-line-of holes storage rack column. The caster assembly of the invention includes an elongate vertical housing having a U-shape in horizontal cross-section, sized to overfit a column of a storage rack. Within the housing is located an adaptor plate which is machine screw or bolt-connected to a front wall of the housing. The adaptor plate provides four lugs arranged in two vertical columns and spaced to engage four corresponding engaging holes provided on the web portion of the column.

Attached to the housing on opposite lateral sides thereof are caster wheel deployment assemblies, each including a strut, to which is mounted a caster wheel. The strut is pivotally connected to the housing. An engagement lever is pinned to the strut and is rotated to lock the strut into a deployed condition. Pivoting of the engagement lever shifts a knee brace which is pinned to the engagement lever and to the housing, and by shifting causes the strut to lift the housing vertically with respect to the floor.

The adaptor plate is fastened to the housing by machine screws or bolts penetrating aligned bolt holes of the adaptor plate and of the front wall of the housing. The bolt holes are arranged vertically along a center line of the housing. The bolt holes are spaced apart and arranged in accordance with a hole spacing on a single-line-of-holes type storage rack column. Nuts can be used on a front side of the housing for completing the fastening of the adapter plate to the housing.

To convert the caster assembly to engage a single-line-of-holes-storage rack column, the adaptor plate is removed by disengaging the machine screws from the bolt holes, and a plurality of individual adaptor lugs are attached by machine screws or bolts using the bolt holes of the housing front wall. The machine screws or bolts can be fastened by nuts arranged on a front side of the front wall of the housing, or on a back side of the adaptor lugs. These adaptor lugs are thus arranged to engage holes in the web portion of a storage rack column to support such column for roll transporting the storage rack section.

According to the invention, a single caster assembly can be provided for both styles of storage rack columns, and adaptor plates and adaptor lugs can be interchangeably used to particularly adapt the caster assembly for the application. The present invention provides a cost effective caster assembly for storage rack assemblers or rearrangers. By stocking adaptor plates and screw lugs rather than different styles of caster assemblies, storage costs can be reduced and a commonality of parts can be achieved.

Numerous other advantages or features of the present invention will become readily apparent from the following detailed description of the invention, from the claims, and from the accompanying drawings.

BRIEF DESCRIPTION OF THE DRAWINGS

FIG. 1 is a partial perspective view of a storage rack framework with caster assemblies installed onto the storage rack assembly;

FIG. 2 is an enlarged, exploded perspective view of the caster assembly taken from FIG. 1 adapted to receive a double-line-of-holes column;

FIG. 3 is an enlarged, partial elevational view taken from FIG. 1 with a portion removed for clarity;

FIG. 4 is a partial sectional view taken generally along line 4—4 in FIG. 3;

FIG. 5 is an enlarged, partial elevational view according to FIG. 3 but at a further stage of engagement;

FIG. 6 is a sectional view taken generally along line 6—6 of FIG. 5;

DETAILED DESCRIPTION OF THE PREFERRED EMBODIMENTS

Figure 7:
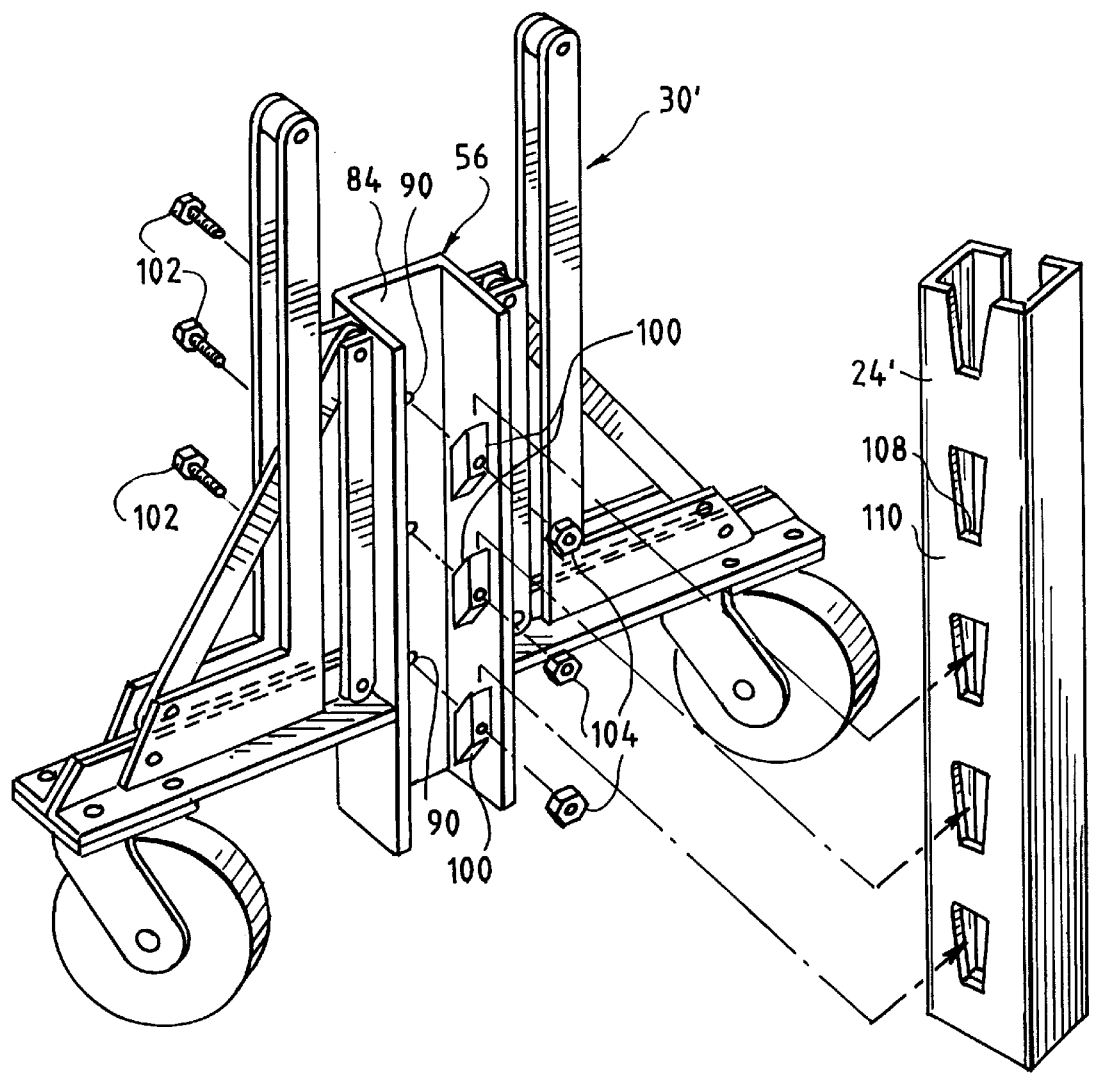
FIG. 7 is an enlarged, partial exploded perspective view of the caster assembly shown in FIG. 1, but modified to receive a single-column-of-holes column.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a storage rack assembly or lattice 20 having a plurality of columns 24 interconnected by longitudinal beams 26. Typically, the columns 20 would be assembled in an elongate grid pattern of at least two parallel rows of columns and interconnected by the longitudinal beams 26 arranged in the longitudinal direction and cross beams (not shown) arranged in the transverse direction. Additionally, diagonal bracing (not shown) is typically arranged between adjacent columns in the transverse direction. The connection of beams to columns is described in more detail in U.S. Pat. No. 5,131,781.

To transport an assembled "train" or section of assembled storage racks, such as pallet racks, caster assemblies are deployed onto some or all of the columns 24. Once the caster assemblies 30 are installed, the section of storage rack can be towed or pulled longitudinally to its deployment area of the warehouse. Once in position, the caster assemblies can be removed. Each caster assembly 30 includes laterally deployed caster wheels 32, 34 rotatably carried on forks 36, 38, particularly on axles 40, 42. The forks 36 are rotatably mounted to base plates 44, 46, which base plates are bolted respectively to struts 48, 50. The struts 48, 50, comprise back-to-back L-shaped structural members which are pivotally connected by a bolt 51 to parallel rail assemblies 52. The rail assemblies 52, 54 are welded to a central housing 56.

The central housing 56 is an elongate vertical member having a squared-U-shaped cross-section. Knee braces 62, 64 proceed from a bolt 65 at a top end of the rail assemblies 52, 54 downward obliquely. The knee braces 62, 64 are each connected to an L-shaped actuating lever 66, 68 by a bolt 67. The actuating levers 66, 68 are pinned themselves to the struts 48, 50 by a bolt 69.

As shown in FIG. 2, the column 24 of a two-lines-of-holes type column which includes on a web surface 70, two columns of tear-drop-shaped holes 72. These tear-drop-shaped holes are shown and described for example in U.S. Pat. No. 5,131,781 and are used for mounting the beams 26 for storage rack assemblies. Each column of holes 72 is available for connection of separate beams which form adjacent bays. The caster assemblies 30 includes an adapter bracket 76 comprising a base plate 77 having L-shaped lugs 78 arranged extending therefrom in a rectangular grid. The lugs 78 are selectively spaced to engage four holes, two from each of the two lines of holes 72 of a column 24. The lugs 78 are formed by partially punching and then bending plate material, which results in voids 79 in the plate 77 at each lug 78. The adaptor bracket 76 is connected by machine screws or bolts 80 to a front wall 84 of the housing 56. The bracket 76 has bevelled, tapered screw-receiving holes 85 so that the screws 80 can fit flushly with a surface 86 of the bracket 76 for non-interference with the column 24 once engaged within the housing 56. The screws 80, once passing through the front wall 84, are fastened with nuts (not shown). Alternatively, the corresponding holes 90 through the front wall 84 can be tapped for receipt and fixation of the screws 80 therein.

The caster assembly 30, including the adaptor bracket 76, can be composed of a sturdy, durable material such as steel. The wheel 32, 34 can be composed of conventional materials suitable for their intended purpose, such as hard rubber.

In operation, as shown progressively from FIG. 3 to FIG. 5, to deploy the caster assembly 30, the L-shaped levers 66, 68 are pivoted in the opposite directions A, B to assume a generally upright posture as shown in FIG. 5. This action causes a swinging of the knee braces 62, 64 in the opposite directions C, D, which in turn thrusts the struts, 48, 50 in the opposite directions E, F, to press the wheels 32, 34 against the grade or floor G which elevates the column 24 to a distance H. Once so elevated, the column 24, and the associated lattice of columns with a plurality of identical engaged caster assemblies, can be rolled on the wheels 32, 34 to another location.

To disengage the assembly, the L-shaped levers 66, 68 are pivoted in the opposite directions J, K and the wheels 32, 34 are thus retracted and the housing 56 with connected column 24 is lowered until the column 24 touches the grade G. The assembly 30 can then be lifted and moved from the column.

FIG. 4 shows in section how the L-shaped lugs are engaged to the column 24, and particularly to the web portion 70 of the column 24, into the holes 72 thereof. The housing 56 is moved in the horizontal direction L to pass the lugs 78 through the holes 72, and when the housing 56 is lifted as shown in FIG. 5, by movement of the lever 66, 68 in the opposite directions A, B, the lugs 78 are completely engaged.

As shown in FIG. 6, a vertical movement of the bracket 76, secured to the housing 56, lifts the L-shaped lug 78 to engage the web 70 and prevents relative horizontal movement between the web 70 and the lug 78 which would otherwise separate the housing 56 from the column 24.

FIG. 7 illustrates a caster assembly 30' which includes all of the components of the assembly 30 shown in FIG. 2 except for the adaptor plate 76, screws 80 and associates nuts. In the assembly 30' shown in FIG. 7, individual rhombic-shaped lugs 100, three illustrated, are secured by bolts 102 and associated nuts 104 to the front wall 84 of the housing 56. The bolts 102 are inserted through the holes 90 present in the front wall 84 and through a bolt hole 104 provided through the lug 100. The nut 104 is thereupon screwed tight onto the bolt 102 to secure the lug 100 to the front wall 84. The holes 90 through the front wall 84 are selectively spaced and arranged to allow the lugs 100 to correspond to the known spacing of shaped beam-receiving holes 108 of an alternate column 24'. The alternate column is of the single-line-of-holes column style.

Figure 8:
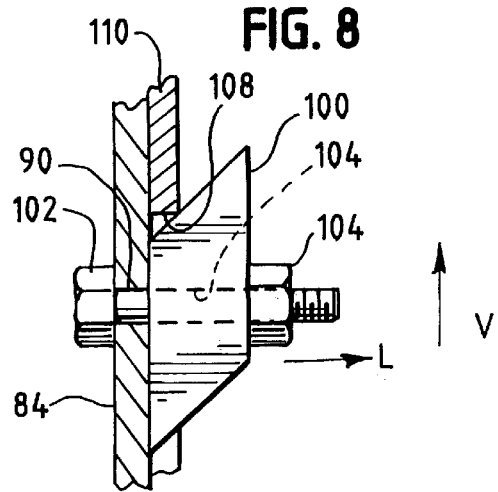
FIG. 8 is a partial sectional view of a lug attachment as shown in FIG. 7.

As shown in FIG. 8, the lug 100 has a rhombic shape with a top sloped surface 100a which acts as a hook, and a bottom sloped surface 100b which facilitates insertion and positioning of the lug 100 into the hole 108. The lug 100 is first moved through the hole 108 in the horizontal direction L. When the assembly 30' is actuated to lift the housing 56 vertically, as described in FIGS. 3 and 5, the lug 100 is lifted in the direction V to engage the web portion 110 of the alternate column 24' to prevent horizontal retraction of the web portion 110 from the front wall 84.

Although in the illustrated embodiment the lugs 78 are mounted as a group via the plate 77 to the housing and the lugs 100 are connected separately by fasteners, this arrangement could be reversed such that fastener holes in the front wall 84 could have a pattern which corresponds to the engagement holes pattern of a two-lines-of-holes column type and the lugs 78 could be mounted as a group on a plate using these fastener holes. The lugs 78 could be arranged corresponding to a single-line-of holes-style column. The lugs 100 could be mounted individually to the front wall in the two-lines-of-holes-type column pattern. Also, the invention encompasses the pre-mounting of lugs for both single-line-of-holes style columns and two lines-of-holes style columns on plates using fastener holes through the front wall 84 of the housing.

It is important to note that according to the principles of the present invention, a single caster assembly 30, 30' can be used with either adaptor plate 76 having lugs or individual lugs 100, to engage and lift both the column type 24 and the alternate column type 24'. It should be noted that, although a specific mechanism and apparatus for undertaking the lifting of the column and engagement of the caster wheels is shown and described, the principle of the present invention can be applied to other caster mechanisms, as well.

From the foregoing, it will be observed that numerous modifications and variations can be effected without departing from the spirit and scope of the novel concept of the present invention. It is to be understood that no limitation with respect to the specific embodiments disclosed herein is intended or should be inferred. The disclosure is intended to cover by the appended claims all such modifications as fall within the scope of the claim.

We claim:

1. A caster assembly for lifting a column, comprising at least one wheel engageable with a surface which supports the column;
    a housing for engaging a column;
    a substantially horizontal first strut pivotally connected to said housing and connected to a first wheel;
    a first lever pivotally connected to said first strut;
    a first knee brace pivotably connected to said first lever and to said housing;
    pivoting of said first lever in a first direction closing an angle defined between the housing and the first strut, and pivoting the first lever in a second direction opening the angle defined between said housing and said first strut.

2. The caster assembly according to claim 1, wherein said first lever is substantially L-shaped, wherein a substantially vertical leg of said L-shaped lever is usable as a handle, and wherein a substantially horizontal leg of said L-shaped first lever is pivotally connected at a first point to said first strut adjacent an end of said substantially horizontal leg, and said knee brace is pivotally connected to said horizontal leg at a second point and pivotally connected to said housing at a third point, and said first strut is pivotally connected to said housing at a fourth point; and
    wherein said angle defined between said first strut and said housing is completely opened by rotary movement of said first lever, said first, third and fourth points define a right angle triangle, and said second point falls on or within said triangle.

3. The caster assembly according to claim 2, further comprising a second strut, a second knee brace, a second lever and a second wheel, assembled and connected to said housing in identical, but mirror image fashion about a vertical axis of said column, as said first strut, said first knee brace, said first lever, and said first wheel are assembled and attached to said housing.

4. The caster assembly according to claim 1, further comprising a second strut, a second knee brace, a second lever and a second wheel, assembled and connected to said housing in identical, but mirror image fashion about a vertical axis of said column, as said first strut, said first knee brace, said first lever, and said first wheel are assembled and attached to said housing.

5. The caster assembly according to claim 4, wherein said housing is a vertical C-shaped channel having vertical rail assemblies mounted on opposite sides thereof, each of said first and second knee braces, and said first and second struts being bolt connected to opposite ends of each respective vertical rail.

6. The caster assembly according to claim 5, wherein said housing includes lugs mounted to a center wall of said C-shaped channel arranged and spaced to engage holes in the column.

7. A caster assembly for lifting a column, comprising:
    a C-shaped channel having a center wall and two side walls and arranged vertically, said channel having lugs on the center wall facing inwardly of said C-shaped channel, said lugs for engaging holes of a column fittable within said C-shaped channel;
    first and second struts mounted pivotally to outside surfaces of the side walls of said C-shaped channel and extending outwardly therefrom;
    first and second wheels mounted to said first and second struts and arranged to contact a surface below said struts;
    first and second linkages arranged and connected between said side walls and said first and second struts;
    first and second levers connected to said first and second linkages and said first and second struts respectively, movement of said first and second levers causing pivoting of said first and second struts, and relative lifting of said C-shaped channel with respect to said wheels.

8. The caster assembly according to claim 7, wherein said first and second linkages each comprise a knee brace pivotally connected to a respective side wall and to a respective lever.

9. The caster assembly according to claim 8, wherein each of said levers comprises and L-shape having its horizontal leg pivotally attached to one of said first and second struts at a first position, and having one of said knee braces pivotally connected to its horizontal leg at a second position approximately on the hypotenuse of a right triangle formed by said respective side wall, said respective strut, and a line drawn between a third position where the one knee brace is pivotally connected to the respective side wall and said first position, when said C-shaped channel is in a lifted position.

* * * * *